United States Patent [19]

Chiang et al.

[11] Patent Number: 4,678,765
[45] Date of Patent: Jul. 7, 1987

[54] CATALYTIC CRACKING CATALYSTS FOR HIGH OCTANE GASOLINE PRODUCTS

[75] Inventors: Robert L. Chiang, Oakland, N.J.; Mark T. Staniulis, Peekskill, N.Y.

[73] Assignee: Union Carbide Corporation, Danbury, Conn.

[21] Appl. No.: 657,482

[22] Filed: Oct. 3, 1984

[51] Int. Cl.$^4$ .............................................. B01J 29/06
[52] U.S. Cl. ........................................ 502/65; 502/73
[58] Field of Search ..................................... 502/65, 73

[56] References Cited

U.S. PATENT DOCUMENTS 4,503,023 3/1985 Breck .................................... 423/328
4,534,853 8/1985 Long et al. ........................... 208/120

*Primary Examiner*—Carl F. Dees
*Attorney, Agent, or Firm*—Vincent J. Vasta, Jr.

[57] ABSTRACT

Catalytic cracking catalysts, the process of their preparation and the process of their use. Cracking catalysts are disclosed for improving the octane number of gasoline products. The catalysts comprise a zeolitic aluminosilicate having a mole ratio of oxides in the dehydrated state of

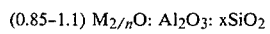

$$(0.85\text{-}1.1)\ M_{2/n}O: Al_2O_3: xSiO_2$$

wherein M is a cation having a valence of "n" and "x" has a value greater than 6.0 to about 11.0; has an x-ray powder diffraction pattern having at least the d-spacings of Table A; has extraneous silicon atoms in the crystal lattice in the form of framework $SiO_4$ tetrahedra; has between greater than zero to less than 5.0 percent by weight, expressed as the oxide, of at least one rare earth cation selected from the group consisting of cerium, lanthanum, praseodymium, neodymium, promethium, samarium, europium, gadolinium, terbium, dysprosium, holmium, erbium, thulium, ytterbium and lutetium; and less than 1.2 weight percent $Na_2O$ based on the weight of the aluminosilicate.

7 Claims, 7 Drawing Figures

CATALYTIC CRACKING CATALYSTS FOR HIGH OCTANE GASOLINE PRODUCTS

FIELD OF THE INVENTION

The present invention relates to cracking catalysts for increasing gasoline octane number and to the process of their use. The catalysts are derived from novel zeolitic aluminosilicates having $SiO_2/Al_2O_3$ ratios greater than 6 to about 11, low rare earth content and low $Na_2O$ content.

BACKGROUND OF THE INVENTION

Catalytic cracking catalysts and catalytic cracking processes are well known in the patent and scientific literature. Such literature has largely dealt with the preparation of modified zeolites for use as cracking catalysts. The following patents are representative of the prior art.

The use of conversion catalysts formed from a zeolite dispersed in a siliceous matrix has been disclosed in U.S. Pat. No. 3,140,249 and U.S. Pat. No. 3,352,796.

The use of blended matrix components, e.g., a catalyst comprising a zeolite, an inorganic oxide matrix and inert fines, which may be alpha alumina, is disclosed in U.S. Pat. No. 3,312,615. Catalysts comprising an amorphous silica-alumina, separately added alumina and a zeolite are disclosed in U.S. Pat. No. 3,542,670 and catalyst comprising a zeolite, an amorphous hydrous alumina and alumina monohydrate are disclosed in U.S. Pat. No. 3,428,550.

It has been disclosed that the steam and thermal stability of zeolites can be improved by the use of zeolites having a low level of alkali metal content and a unit cell size less than about 24.45 Angstroms (See: U.S. Pat. Nos. 3,293,192 and Re. 28,629 (Reissue of U.S. Pat. No. 3,402,996)).

Further, it has been disclosed (U.S. Pat. No. 3,591,488) that the hydrogen or ammonium form of a zeolite may be treated with $H_2O$ at a temperature ranging from about 800° to about 1500° F., and then subsequently cation exchanging the steam and water treated zeolite with cations which may be rare earth metal cations. The method increases the silica to alumina mole ratio of the zeolite crystal framework lattice and also crystal structure imperfections. U.S. Pat. No. 3,676,368 discloses a rare earth exchanged-hydrogen faujasite containing from 6 to 14 percent rare earth oxides. U.S. Pat. No. 3,957,623 discloses a rare earth exchanged zeolite having a total of 1 to 10 weight percent rare earth metal oxide. U.S. Pat. No. 3,607,043 discloses a process for preparing a zeolite having a rare earth content of 0.3 to 10 weight percent.

U.S. Pat. No. 4,036,739 discloses hydrothermally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

The recent interest in high octane gasoline has resulted in the development of catalyst systems directed to improvement in the octane number of the products of catalytic cracking processes. For example, U.S. Pat. Nos. 3,758,403, 3,894,931, 3,984,933, 3,894,934 and 4,309,280 relate to cracking catalysts containing ZSM-5 type zeolites as catalyst components.

In addition to the above, a new approach to the improvement of cracking catalysts has been the development of new zeolitic aluminosilicates capable of providing unique properties when employed in cracking catalysts. One such family of new zeolitic aluminosilicates is disclosed in E.P.C. Application Publication No. 82,111 published June 28, 1983. The use of rare earth exchanged forms of such zeolitic aluminosilicates is disclosed in copending U.S. Ser. No. 490,965, filed May 2, 1983. Although such copending application generally discloses rare earth exchanged zeolites, such does not disclose catalysts having critical amounts of rare earth cation and $Na_2O$, as claimed by the instant invention, whereby gasoline products having improved octane number are obtained.

The instant invention relates to an improved process for upgrading the octane number of the gasoline products from catalytic cracking processes.

SUMMARY OF THE INVENTION

Figure 1:
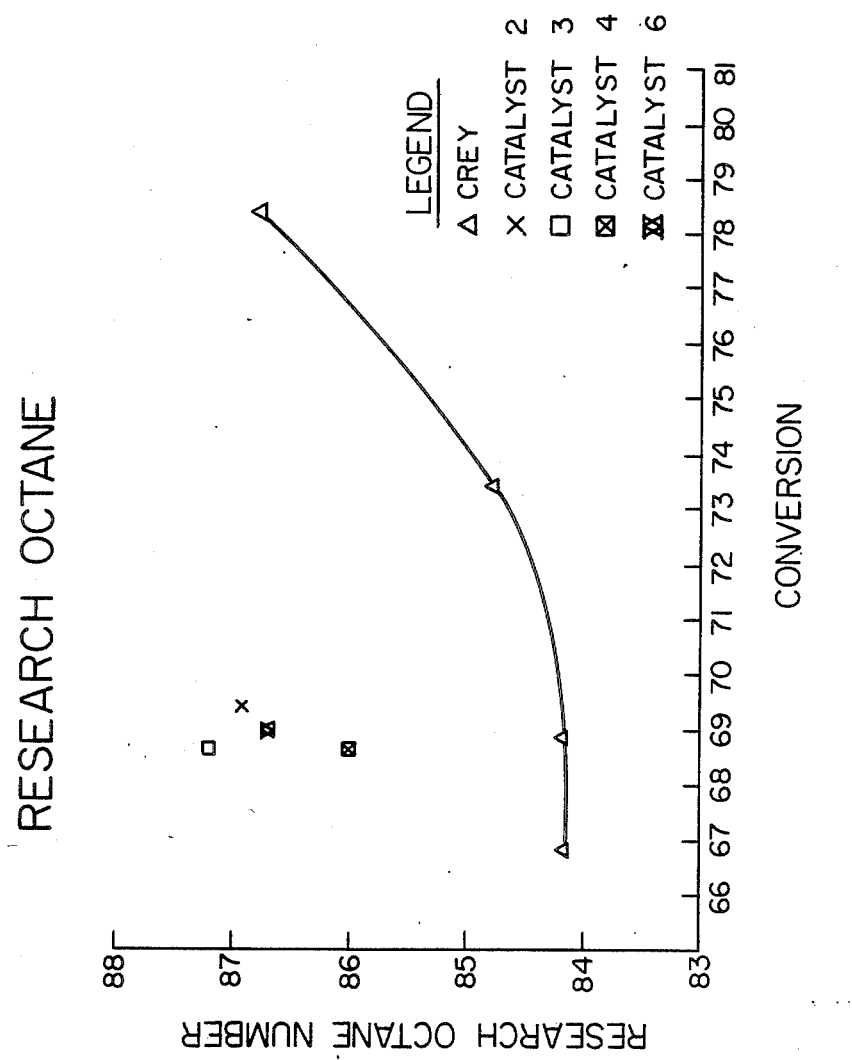
FIG. 1 is a plot of the Research Octane Number vs. Conversion for a calcined rare earth Y zeolite (CREY) catalyst and catalysts according to this invention (LZ-210-X).

The instant invention relates to cracking catalysts and to the process for the catalytic cracking of a feedstock derived from a crude oil to produce lower boiling hydrocarbons having improved octane number. The process comprises contacting said feedstock with a catalyst comprising: (a) a zeolitic aluminosilicate which has a mole ratio of oxides in the dehydrated state of

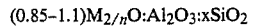

$$(0.85-1.1)M_{2/n}O:Al_2O_3:xSiO_2$$

wherein M is a cation having a valence of "n" and x has a value greater than 6 to about 11; having an X-ray powder diffraction pattern having at least the d-spacings of Table A; having extraneous silicon atoms in the crystal lattice in the form of framework $SiO_4$ tetrahedra; (b) an inorganic oxide matrix; and (c) having from greater than zero to less than 5 weight percent rare earth as the oxide, based on the weight of the zeolite; (d) and having less than 1.2 weight percent $Na_2O$, based on the weight of said zeolitic aluminosilicate. The selection of the value of "x", the weight percent rare earth and weight percent Na$_2$O are correlated to provide for products having improved octane number, as hereinafter discussed.

DETAILED DESCRIPTION OF THE INVENTION

The present invention relates to catalytic cracking catalysts for improving the octane number of gasoline products of cracking processes, their method of preparation and the process of their use in catalytic cracking processes.

The catalytic cracking catalysts of the instant invention are derived from a novel class of zeolitic aluminosilicates denominated as LZ-210 which are described in E.P.C. Application Publication No. 82,111, published June 29, 1983, said published application being incorporated herein by reference thereto.

It has been discovered that cracking catalysts employing specific forms of LZ-210 and having specific levels of rare earth and Na$_2$O provide catalytic cracking catalysts which have improved catalytic activity and selectivity to desired lower boiling hydrocarbon products having improved octane number.

The cracking catalysts of the instant invention generally comprise:

(a) a zeolitic aluminosilicate which has a mole ratio of oxides in the dehydrated state of $$(0.85-1.1)M_{2/n}O:Al_2O_3:xSiO_2$$

wherein M is a cation having a valence of "n" and x has a value greater than 6 to about 11, preferably greater than 6 to about 9 and more preferably greater than 6 to about 8; have an X-ray powder diffraction pattern having at least the d-spacings of Table A; and having extraneous silicon atoms in the crystal lattice in the form of framework SiO$_4$ tetrahedra;

(b) an inorganic oxide matrix;

(c) from greater than zero to about 5, preferably between about 0.5 and about 4, percent by weight of at least one rare earth cation, as the oxide, based on the total weight of the zeolitic aluminosilicate employed in such catalyst; and (d) less than 1.2 percent by weight Na$_2$O, based on the total weight of said zeolitic aluminosilicate employed in such catalyst.

The weight percent rare earth is an effective amount below about 5 percent by weight, based on the weight of the zeolitic aluminosilicate and the amount of Na$_2$O is less that about 1.2 weight percent, preferably less than about 1.0 weight percent, based on the weight of the zeolitic aluminosilicate. The catalysts of the instant invention having such critical SiO$_2$ to Al$_2$O$_3$ ratios, rare earth content and Na$_2$O content provide catalysts which when employed in catalytic cracking processes give products having improved octane number.

The catalysts of the instant invention are unique in several respects including the achievement of a low content of Na$_2$O in the final catalyst without the requirement of a Na$_2$O calcination of the catalyst for the purpose of reducing the total Na$_2$O content. In one embodiment the use of a Na$_2$O calcination step to promote removal of sodium cations may be incorporated as a process step when the inorganic oxide matrix has a high Na$_2$O content since such Na$_2$O may become associated with the zeolitic aluminosilicate as a result of the mixture of the inorganic oxide matrix with the zeolitic aluminosilicate. Alternatively, Na$_2$O resulting from the matrix can be removed by a post-treatment process, such as that disclosed in copending and commonly assigned U.S. Ser. Nos. 657,413 and 659,641 filed concurrent herewith, or the catalyst may be ion exchanged with cations, e.g., ammonium ion or rare earth cations, after a Na$_2$O calcination.

The term "Na$_2$O calcination" is used herein as a thermal treatment provided for the purpose of redistributing the cations of the zeolite to increase their ease of removal, i.e., promote removal, by ion-exchange with suitable cations. Accordingly, in this disclosure and in the appended claims, the term "Na$_2$O calcination" is employed to denominate thermal treatment of the zeolite (alone or in combination with the inorganic oxide matrix) at an effective temperature to effect a thermal redistribution of cations, e.g., alkali metal cations, associated with the zeolite. The term "Na$_2$O calcination" is generally understood to include thermal and/or hydrothermal treatments at temperatures of 300° C. and higher for about 1 hour and more, since at such a temperature and for such a period of time at least some redistribution of the cations associated with the zeolite is effected to promote their removal by subsequent ion exchange. Processes such as spray drying which are carried out at temperatures of about 200° C. for a period of 5 seconds or less are not considered to come within the scope of the term "Na$_2$O calcination", since such processes are of such short duration that no redistribution of the cations associated with the zeolite occurs. Further, a calcination step not followed by a cation exchange, e.g., ammonium ion or rare earth cation exchange, is not a "Na$_2$O calcination" step within the meaning of this invention, since such has not been carried out to effect the removal of cations associated with the zeolite, and as a result facilitate by thermal means an increase in the ease of ion exchange of such.

The catalysts of the present invention will be referred to herein, solely for the purpose of reference herein, as "LZ-210-X". LZ-210-X catalysts may also be subjected to thermal treatment and/or hydrothermal treatments, and/or subjected to a treatment with a multivalent cation other than rare earth cations, although the thermal treatments heretofore required in the preparation of cracking catalysts to promote the removal of sodium cations are not required herein.

DESCRIPTION OF ZEOLITE LZ-210

LZ-210 is generally described as an aluminosilicate having in the dehydrated state, a chemical composition expressed in terms of mole ratios of oxides as $$(0.85-1.1)M_{2/n}O:Al_2O_3:xSiO_2$$

wherein "M" is a cation having the valence "n" and "x" has a value greater than 6; having an X-ray powder diffraction pattern having at least the d-spacings set forth in Table A, below; and having extraneous silicon atoms in its crystal lattice in the form of SiO$_4$ tetrahedra, preferably in an average amount of at least 1.0 per 10,000Å$^3$.

For purposes of reference herein the framework composition is best expressed in terms of mole fractions of framework tetrahedra TO$_2$. The starting zeolite may be expressed as:

$$(Al_aSi_b\square_z)O_2$$

wherein "a" is the mole fraction of aluminum tetrahedra in the framework; "b" is the mole fraction of silicon tetrahedra in the framework; □ denotes defect sites and "z" is the mole fraction of defect sites in the zeolite framework. In many cases the "z" value for the starting zeolite is zero and the defect sites are simply eliminated from the expression. Numerically the sum of the values $a+b+z=1$.

The zeolite product of the fluorosilicate treatment, expressed in terms of mole fraction of framework tetrahedra ($TO_2$) will have the form $$[Al_{(a-N)}Si_{b+(N-\Delta z)}\square_z]O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; $(N-\Delta z)$ is the mole fraction increase in silicon tetrahedra resulting from the fluorosilicate treatment; "$\Delta z$" is the net change in the mole fraction of defect sites in the zeolite framework resulting from the treatment; and $\Delta z = z$ (product zeolite) $-z$ (starting zeolite). The term "Defect Structure Factor" for any given zeolite is equivalent to the "z" value of the zeolite and is further discussed hereinafter. The net change in Defect Structure Factors between the starting zeolite and the product zeolite is equivalent to "$\Delta z$". Numerically, the sum of the values:

$$(a-N)+[b+(N-\Delta z)]+z=1$$

A subclass of the above LZ-210 compositions, i.e., those which are characterized by having both high molar $SiO_2/Al_2O_3$ ratios and low Defect Structure Factors (as hereinafter discussed), can be defined as having a chemical composition expressed in terms of mole fractions of framework tetrahedra as:

$$[Al_{(a-N)}Si_{b+(N-\Delta z)}\square_z]O_2$$

wherein: the mole fraction of aluminum removed from the framework of the starting zeolite is "N";

$$\frac{b + (N - \Delta z)}{a - N}$$

has a value greater than 6; the change in defect structure factor $\Delta z$ is less than 0.08 and preferably less than 0.05; an increased silicon content in the framework of the product zeolite, $(N-\Delta z)$ which is increased by a value for $(N-\Delta z)/N$ of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

TABLE A

| d(A) | Intensity |
|---|---|
| 14.22–13.97 | very strong |
| 8.71–8.55 | medium |
| 7.43–7.30 | medium |
| 5.66–5.55 | strong |
| 4.75–4.66 | medium |
| 4.36–4.28 | medium |

TABLE A-continued

| d(A) | Intensity |
|---|---|
| 3.75–3.69 | strong |
| 3.30–3.23 | strong |
| 2.85–2.79 | strong |

Zeolite LZ-210 as defined above will have cubic unit cell dimension, $a_o$, of less than 24.61 Angstroms, preferably from 24.20 to 24.61 Angstroms, and an adsorption capacity for water vapor at 25° C. and 4.6 Torr water vapor pressure of at least 20 weight percent based on the anhydrous weight of the zeolite, and preferably an oxygen adsorption capacity at 100 Torr and $-183°$ C. of at least 25 weight percent.

LZ-210 can be prepared by a method which removes framework aluminum from a zeolite having $SiO_2/Al_2O_3$ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in E.P.C. Publication No. 82,111, published June 29, 1983, incorporated herein by reference thereto, comprises contacting a crystalline zeolite having pore diameters of at least about 3 Angstroms and having a molar $SiO_2/Al_2O_3$ ratio of at least 3, with a fluorosilicate salt, preferably in an amount of at least 0.0075 moles per 100 grams of zeolite starting material, said fluorosilicate salt being in the form of an aqueous solution wherein the slurry of the zeolite and fluoro salt have a pH value in the range of 3 to about 7, preferably 5 to about 7. The fluoro salt is brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar $SiO_2/Al_2O_3$ ratio of less than 6 by using the above process to increase the $SiO_2/Al_2O_3$ ratio to a value greater than 6. A preferred procedure comprises:

(a) providing a zeolite Y composition having a molar $SiO_2/Al_2O_3$ ratio less than that of the final product;

(b) contacting and reacting at a temperature of from 20° to 95° C., said zeolite Y with a fluorosilicate, preferably ammonium fluorosilicate. The fluorosilicate solution is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y composition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly it is preferred that the $SiO_2/Al_2O_3$ ratio of the starting zeolite be at least 3.0. Also it is preferred that at least about 50, more preferably at least 95%, of the $AlO_4^-$ tetrahedra of the naturally occurring or as-synthesized zeolite are present in the starting zeolite. Most advantageously the starting zeolite contains as many as possible of its original $AlO_4^-$ tetrahedra, i.e., has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations from the most soluble salt in this regard and it is accordingly preferred that at least 50 percent, most preferably 85 or more percent, of the zeolite cations be ammonium cations. Sodium and potassium, two of the most common original cations in zeolites, are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula $$(A)_{2/b}SiF_6$$

wherein A is preferably a metallic or non-metallic cation other than $H^+$ having the valence "b". Cations represented by "A" are alkylammonium, $NH_4^+$, $H^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and the overall process of substituting silicon for aluminum in the zeolite framework is a two-step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

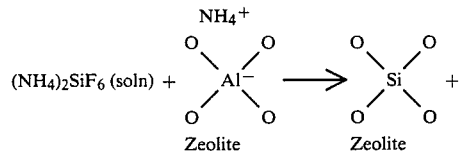

$(NH_4)_3AlF_6$ (soln)

It is, therefore, essential that the rate of the initial dealumination step be inhibited and the rate of the silicon insertion step be promoted to achieved the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also, increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid undue destructive acidic attack on the zeolite structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite starting material. In general the more highly siliceous the zeolite, the higher the permissible reaction temperature and the lower the suitable pH conditions. In general the preferred reaction temperature is within the range of 50° to 95° C., but temperature as high as 125° C. and as low as 20° C. have been suitably employed in some instances. At pH values for the slurry of the fluoro salt and the zeolite below about 3 crystal degradation is generally found to be unduly severe, whereas at pHvalues high than 7, silicon insertion is unduly slow. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly, it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent, the undissolved solids being readily available to replace dissolved molecular species consumed in reaction with the zeolite. As stated hereinabove, the amount of dissolved fluorosilicates employed with respect to the particular zeolite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

It is apparent from the foregoing that, with respect to reaction conditions, it is desirable that the integrity of the zeolite crystal structure is substantially maintained throughout the process, and that in addition to having extraneous silicon atoms inserted into the lattice, the zeolite retains at least 80 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak areas, in terms of arbitrary units above background, of the starting material is used as the standard and is compared with the corresponding peak areas of the products. When, for example, the numerical sum of the peak areas of the product is 85 percent of the value of the sum of the peak areas of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T) as described in J. Am. Chem. Soc. 60 309 (1938) using nitrogen as the adsorbate. In determining the adsorption capacity, the capacity for oxygen at $-183°$ C. at 100 Torr is preferred.

All available evidence, to date, indicates that the above described process is unique in being able to produce zeolites essentially free of defect structure yet having molar $SiO_2/Al_2O_3$ ratios higher than those heretofore obtained by direct hydrothermal synthesis, i.e., no other process is known to date for preparing LZ-210. The products resulting from the operation of the process share the common characteristic of having a higher molar $SiO_2/Al_2O_3$ ratio than previously obtained for each species by direct hydrothermal synthesis by virtue of containing silicon from an extraneous, i.e., non-zeolitic, source, preferably in conjunction with a crystal structure which is characterized as containing a low level of tetrahedral defect sites. This defect structure, if present, is revealed by the infrared spectrum of zeolites in the hydroxyl-stretching region.

In untreated, i.e., naturally occurring or as-synthesized zeolites the original tetrahedral structure is conventionally represented as

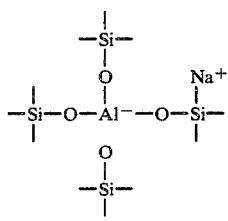

After treatment with a complexing agent such as ethylene-diaminetetraacetic acid (EDTA) in which a stoichiometric reaction occurs whereby framework aluminum atoms along with an associated cation such as sodium are removed as NaAlEDTA, it is postulated that the tetrahedral aluminum is replaced by four protons which form a hydroxyl "nest", as follows:

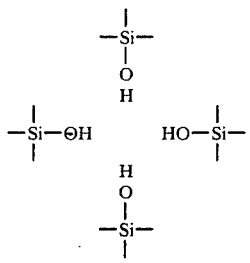

The infrared spectrum of the aluminum-depleted zeolite will show a broad nondescript absorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interfering hydroxyl groups and thus be able to observe the absorption attributable to the "nest" hydroxyls only. The hydroxyls belonging to adsorbed water were avoided by subjecting the hydrated zeolite sample to vacuum activation at a moderate temperature of about 200° C. for about 1 hour. This treatment permits desorption and removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It has been found, however, that the ion-exchange treatment, which must necesssarily be exhaustive even though mild, requires considerable time. Also the combination of the ion-exchange and the vacuum calcination to remove adsorbed water does not remove every possible hydroxyl other than defect hydroxyls which can exhibit adsorption in the 3745 cm$^{-1}$ to 3000 cm$^{-1}$ range. For instance, a rather sharp band at 3745 cm$^{-1}$ has been attributed to the Si—OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically absorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counterparts and also with equally siliceous prior known counterparts prepared by other techniques.

DEFECT STRUCTURE FACTOR (A) Defect Structure Zeolite Standard.

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples, can be ascertained by conventional chemical analytical procedure. The molar SiO$_2$/Al$_2$O$_3$ ratio of the starting zeolite used to prepare the standard sample in any given case is not narrowly critical, but is preferably within about 10% of the molar SiO$_2$/Al$_2$O$_3$ ratio of the same zeolite species used as the starting material in the practice of the process of the present invention.

(B) Infrared Spectrum of Product Samples and Defect Structure Zeolite Standard.

Fifteen milligrams of the hydrated zeolite to be analyzed are pressed into a 13 mm. diameter self-supporting wafer in a KBr die under 5000 pounds per square inch (psi) pressure. The wafer is then heated at 200° C. for 1 hour at a pressure of not greater than 1×10$^{-4}$ mm. Hg to remove all observable traces of physically adsorbed water from the zeolite. This condition of the zeolite is evidenced by the total absence of an infrared absorption band at 1640 cm$^{-1}$. Thereafter, and without contact with adsorbable substances, particularly water vapor, the infrared spectrum of the wafer is obtained on an interferometer system at 4 cm$^{-1}$ resolution over the frequency range of 3745 to 3000 cm$^{-}$. Both the product sample and the standard sample are analyzed using the same interferometer system to avoid discrepancies in the analysis due to different apparatus. The spectrum, normally obtained in the transmission mode of operation, is mathematically converted to and plotted as wave number vs. absorbance.

(C) Determination of the Defect Structure Factor.

The defect structure factor (z) is calculated by substituting the appropriate data into the following formula:

$$z = \frac{AA_{(ps)} \times \text{(Mole fraction of defects in the standard)}}{AA_{(std)}}$$

wherein AA$_{(ps)}$ is the infrared absolute absorbance measured above the estimated background of the product sample at 3710 cm$^{-1}$; AA$_{(std)}$ is the absolute absorbance measured above the background of the standard at 3710 cm$^{-1}$ and the mole fraction of defects in the standard is determined in accordance with part (A) above.

Once the defect structure factor, z, is known, it is possible to determine from wet chemical analysis of the product sample for SiO$_2$, Al$_2$O$_3$ and the cation content as M$_{2/n}$O whether silicon has been substituted for aluminum in the zeolite as a result of the treatment and also the efficiency of any such silicon substitution.

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased SiO$_2$/Al$_2$O$_3$ molar ratio.

The essential X-ray powder diffraction patterns appearing in this specification and referred to in the appended claims are obtained using standard X-ray powder diffraction techniques. The rdiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where theta is the Bragg angle, as observed on the strip chart. Intensities are determined from the heights of diffraction peaks after subtracting background.

In determining the cation equivalency, i.e., the molar ratio M$_{2/n}$O/Al$_2$O$_3$ in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valance of the cation is employed in balancing the net negative charge associated with each AlO$_4$$^-$ tetrahedron or whether some of the positive valence of the cation is used in bonding with OH⁻ or H₃O⁺ ions.

The preferred novel crystalline aluminosilicate compositions of the present invention will contain a chemical or molar framework composition which can be determined from the expression of mole fractions of framework tetrahedra previously described:

$$[Al_{(a-N)}Si_{b+(N-\Delta z)}\Box_z]O_2$$

wherein: the framework Si/Al ratio is determined by $$\frac{b + (N - \Delta z)}{a - N}$$

and is numerically greater than 3, the mole fraction of silicon tetrahedra substituted into the framework of the product zeolite $(N-\Delta z)$ increases $(N-\Delta z)/N$ by at least a value which is numerically equal to or greater than 0.5, the change is Defect Structure Factor $\Delta z$ is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

CATALYST LZ-210-X

The catalyst LZ-210-X of the instant invention comprises: (a) LZ-210, as above described, having a $SiO_2$ to $Al_2O_3$ ratio of greater than 6 to about 11; (b) an inorganic oxide matrix; (c) between greater than zero and about 5, preferably between about 0.5 and about 4 and more preferably between about 2 and about 3 weight percent, of at least one rare earth cation, expressed as the oxide, based on the weight of zeolite LZ-210 employed in the catalyst; and (d) having less than 1.2 weight percent $Na_2O$, preferbly less than 1.0 weight percent and more preferably less than 0.9 weight percent based on the weight of the zeolite LZ-210 employed in the catalyst. The correlation of the $SiO_2$ to $Al_2O_3$ ratio, rare earth content and weight percent $Na_2O$, as above described, provides a catalyst composition which provides products having improved octane number when such are employed in cracking processes. Such a correlation has not heretofore been possible with traditional Y zeolites. The finished LZ-210-X catalysts may also be thermally treated.

The $SiO_2$ to $Al_2O_3$ ratio of LZ-210-X is greater than 6 to about 11, preferably greater than 6 to 9 and more preferably greater than about 6 to about 8. In one embodiment the $SiO_2$ to $Al_2O_3$ ratio of LZ-210 is greater than 6 to about 7, the effective amount of rare earth is between about 2.0 and about 3.0 weight percent, based on the zeolite and the weight percent $Na_2O$ is less than 1.2, based on the weight of the zeolite.

The catalysts of the instant invention are unique in several respects including the ability to achieve a low $Na_2O$ content in the finished catalyst without the requirement of a "$Na_2O$ calcination" of the catalyst for the purpose of reducing the total $Na_2O$ content. As above discussed, the term "$Na_2O$ calcination" is used herein as a thermal treatment provided for the purpose of redistributing the cations of the zeolite to promote their ease of removal by subsequent ion-exchange with suitable cations. Further, a calcination step not followed by a cation exchange, e.g., ammonium ion or rare earth cation exchange, is not a "$Na_2O$ calcination" step within the meaning of this invention, since such has not been carried out to effect the removal of cations, e.g., Na cations associated with the zeolite, and as a result facilitate by thermal means an increase in the ease of ion exchange of such.

The term "thermal treatment" is employed here to denominate both a thermal calcination and/or a hydrothermal calcination (thermal calcination in the presence of steam) other than a "$Na_2O$ calcination". The thermal treatment is carried out at an effective temperature and time and when the thermal treatment is a hydrothermal treatment such as in the presence of an effective amount of steam. Thermal treatment is typically carried out at a temperature in excess of 300° C. for a period in excess of 0.25 hours and typically at 500° C. and when a thermal treatment is a hydrothermal treatment it is typically carried out in the presence of at least about 20 percent steam by volume in air. The source of the steam is not important and may be provided from an external source or may be generated in situ at the temperatures employed for the hydrothermal treatment. In many instances it is desirable to thermally treat a finished catalyst to stabilize the structure of the zeolite contained therein, but in such instances, no post ion exchanges are carried out and the thermal treatment is not a $Na_2O$ calcination.

LZ-210-X contains an effective amount of rare earth from greater than zero to less than 5 weight percent based on the zeolite employed in the catalyst, the rare earth being measured and expressed as the oxide. The rare earth content comprises at least one rare earth cation selected from the group consisting of cerium, lanthanum, praseodymium, neodymium, promethium, samarium, europium, gadolinium, terbium, dysprosium, holmium, erbium, thulium, ytterbium and lutetium. The LZ-210 may be ammonium exchanged prior to the rare earth exchange or the LZ-210-X product may be ammonium exchanged. The pre- or post-ammonium exchange, if any, may be carried out one or more times. As a result of the rare earth ion-exchange of the LZ-210 or LZ-210-X the rare earth cation is preferably present in an effective amount between about 0.5 and about 4, preferably between about 2.0 and about 3.0 weight percent rare earth, expressed as the oxide, based on the weight of the zeolite LZ-210.

The ion exchange step(s) (either ammonium, rare earth or other multivalent cations) may be generally carried out by preparing a slurry of the zeolite by adding about 5 to 15 volumes of water per volume of catalyst, after which a solution of the selected salt is added. The ion exchange is generally carried out at room temperature and the resulting solution is then heated to above about 50° C. and stirred at this temperature for about 0.5 to 3 hours. This mixture is then filtered and water washed to remove excess anion present as a result of the solution of the ammonium, rare earth or multivalent cation salt.

Ammonium ion exchange is preferably carried out by slurrying the zeolite with between 5 to 15 volumes of water per volume of catalyst after which a salt is added to the slurry. The resulting mixture is typically heated to a temperature above about 50° C. for a period between minutes to several hours, e.g., 1 minute to 3 hours. The mixture is filtered and water washed until excess anion from the salt is removed. The exchange process is typically repeated one or more times according to the above described procedure.

Cracking catalysts containing LZ-210-X are typically formed with one or more inorganic oxide matrix components which may be any of the inorganic matrices which are typically employed in formulating FCC catalysts including: amorphous catalytic inorganic oxides, clays, silicas, aluminas, silica-alumina, silica-zirconia, silica-magnesia, alumina-boria, alumina-titania, the like and mixtures thereof. The matrix may be added to the LZ-210 before processing to form LZ-210-X or may be added to LZ-210-X. The matrix may be in the form of a sol, hydrogel or gel and is typically an alumina or silica-alumina component such as a conventional silica-alumina cracking catalyst, several types and compositions of which are commercially available. The matrix may itself provide a catalytic effect or it may be essentially inert. The matrix may act as a "binder"0 in some instances although in some instances the final catalyst will be spray dried or formed without the need of a binder. These materials may be prepared as a cogel of silica and alumina or as alumina precipitated on a preformed and preaged hydrogel. The silica may be present as a major component in the solids present in said gels, e.g., present in an amount between about 5 and about 40 weight percent and preferably between about 10 and about 30 weight percent. The silica may also be employed in the form of a cogel comprising about 75 weight percent silica and about 25 weight percent alumina or comprising about 87 weight percent silica and about 13 weight percent alumina.

The inorganic oxide matrix component will typically be present in the catalyst in an amount between about 10 and about 99 weight percent, preferably between about 50 and about 90 weight percent, based on the total weight of the catalyst. It is also within the scope of the instant invention to employ other materials with LZ-210-X in the final cracking catalysts, including various other types of zeolites, clays, carbon monoxide oxidation promoters, etc.

Representative of matrix systems employable herein for the formulation of catalysts are those disclosed in British Patent Specification No. 1,315,553, published May 2, 1973 and U.S. Pat. Nos. 3,446,727 and 4,086,187, such being incorporated herein by reference thereto.

As above mentioned, there catalysts of the present invention may be employed with a matrix component and this may be an alumina component. The alumina component may comprise discrete particles of various aluminas, preferably crystalline aluminas. The alumina component may be in the form of discrete particles having a total surface area, as measured by the method of Brunauer, Emmett and Teller (BET), greater than about 20 square meters per gram ($M^2/g$), and preferably greater than 145 $M^2/g$, for example, from about 145 to about 300 $M^2/g$. The pore volume of the alumina component is typically greater than 0.35 cc/g. The average particle size of the alumina particles is generally less than 10 microns and preferably less than 3 microns. The alumina may be employed alone as the matrix or composited with the other matrix components having inherently less catalytic cracking activity than the alumina matrix component. The alumina component may be any alumina and has preferably been preformed and placed in a physical form such that its surface area and pore structure are stabilized so that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina is typically an alumina which has been formed by suitable chemical reaction, the slurry aged, filtered, dried, washed free of residual salt and then heated to reduce its volatile content to less than about 15 weight percent. The alumina component may be present in the final catalyst in an amount ranging between about 5 and about 95 weight percent, preferably between about 10 and about 30 weight percent based on the total catalyst. Further, an alumina hydrosol or hydrogel or hydrous alumina slurry may be used in the catalyst preparation.

Mixtures of LZ-210-X and an inorganic matrix are typically formed into a final form for the catalyst by standard catalyst forming techniques including spray-drying, pelleting, extrusion and other suitable conventional means. Such catalysts are generally prepared by spray drying procedures and such procedures are well known to those skilled in the art. Alternatively extruded products may be dried in air (110° C.) and then, further dried in an air purge at a programmed temperature increase from room temperature to about 220° C. over a 1.5 hour period, held at 220° C. for about 1.5 hour and then heated to 480° C. over a period of 1.5 hour and held at 480° C. for 1.5 hour. These products may then be crushed and sized to the desired particle size, e.g., less than 150 microns.

One of the advantages of the instant invention is that the final catalyst may be formed without the need of $Na_2O$ calcination steps while still providing a catalyst having less than 1.2, preferably less than 1.0, and more preferably less than 0.9 weight percent $Na_2O$, based on the weight of the zeolite. In some instances the inorganic oxide matrix may contain substantial amounts of $Na_2O$ and $Na_2SO_4$. Although the $Na_2SO_4$ may normally be removed by washing, the $Na_2O$ present in the inorganic oxide matrix may become associated with the zeolite and act to detrimentally affect the finished catalyst. In such instances a $Na_2O$ calcination with ammonium and/or other cation exchange may be employed to remove such added $Na_2O$.

Catalytic cracking catalysts may be prepared by any one of several conventional methods. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering, drying, reslurrying in water to remove sodium and sulfate ions and drying to reduce volatile matter content to less than 15 weight percent. The alumina may then be slurried in water and blended in proper amounts, with a slurry of impure silica-alumina hydrogel. The LZ-210-X component may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically recovered after heating.

In one embodiment of the instant invention cracking catalysts are prepared by the process consisting essentially of: (a) ammonium exchanging an aluminosilicate which has a mole ratio of oxide in the dehydrated state of $$(0.85-1.1)M_{2/n}O:Al_2O_3:xSiO_2$$

wherein M is a cation having a valence of "n" and x has a value greater than 6 to about 11; having an X-ray powder diffraction pattern having at least the d-spacing of Table A; having extraneous silicon atoms in the crystal lattice in the form of framework $SiO_4$ tetrahedra; to provide a zeolitic aluminosilicate having a $Na_2O$ content less than 1.2 percent by weight; (b) rare earth exchanging the product of step (a) to provide between about 0.1 and less than 5 percent by weight rare earth, as the oxide, based on the weight of the zeolitic aluminosilicate; and (c) mixing the product of step (b) with an inorganic oxide matrix to form a catalyst. Alternatively step (c) may be carried out before step (b) and the rare earth exchange can be carried out on the zeolite/matrix mixture. The catalyst may then be dried, e.g., spray dried, and sized as normally carried out for cracking catalysts. The above process is unique in that the catalyst, including the beginning zeolitic aluminosilicate, is prepared without the need of a $Na_2O$ calcination while obtaining a catalyst having less than 1.2 weight percent $Na_2O$, based on the weight of the zeolite.

Catalytic cracking with the catalyst of the present invention can be conducted in any conventional catalytic cracking manner. Suitable catalytic cracking conditions include a temperature ranging from about 400° F. to about 1300° F. and a pressure ranging from about subatmospheric to several atmospheres, typically from about atmospheric to about 100 psig. The process may be carried out in a fixed bed, moving bed, ebulliating bed, slurry, transferline, riser reactor or fluidized bed operation. The catalyst of the present invention can be used to convert any of the conventional hydrocarbon feeds used in catalytic cracking, that is, it can be used to crack naphthas, gas oils and residual oils having a high content of metal contaminants. It is especially suited for cracking hydrocarbons boiling in the gas oil range, that is, hydrocarbon oils having an atmospheric pressure boiling point ranging from about 420° to about 1100° F. to naphthas to yield not only products having a lower boiling point than the initial feed but also products having an improved octane number.

The term "crude oil feed" is used in the instant invention to denominate any full range crude oil from primary, secondary or tertiary recovery from conventional or offshore oil fields and to feedstocks derived from such crude oils. "Crude oil feeds" may include any full range "syncrude" such as those that can be derived from coal, shale oil, tar sands and bitumens. The crude may be virgin (straight run) or generated synthetically by blending. It is generally desirable, however, to first desalt the crude since sodium chloride is known to be a poison for most cracking operations. Further, the term includes crude oil-derived feeds comprising component parts of a crude oil, such being generally employed as catalytic cracking feeds or potential feed therefor and including: feeds such as distillate gas oils, heavy vacuum gas oils, atmospheric and vacuum resids, syncrudes (from shale oil, tar sands, coal), feed derived from hydrocrackers, hydrotreaters, cokers, pyrolysis processes and high boiling FCC product recycle fractions; and fractions boiling above the traditional end of the gasoline boiling range which generally includes compounds containing greater than about eleven carbon atoms and combinations thereof.

In addition, the instant catalyst can be effectively used in an FCC (fluid catalytic cracking) process wherein a carbon-hydrogen fragmentation compound (CHFC) is employed in admixture with a crude oil feed. Such a process will be referred to herein as an FCC-CHFC process.

The term "carbon-hydrogen fragmentation compound(s)" is employed herein to mean materials comprising a lesser number of carbon atoms than found in materials within the gasoline boiling range, preferably those materials containing 5 or less carbon atoms, that fit into any of the categories of:

(a) Hydrogen-rich molecules, i.e., molecules with wt. % hydrogen ranging from about 13.0–25.0 wt. %. This may include light paraffins, i.e., $CH_4$, $C_2H_6$, $C_3H_8$ and other materials.

(b) a molecule whose chemical structure permits or favors the transfer of carbon-hydrogen fragments. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(c) Secondary Reaction Products from materials in categories (a) or (b) above that are carbon-hydrogen fragmentation compounds themselves, or transfer hydrogen. This includes olefins, naphthenes, or paraffins.

(d) Classes of materials which are structurally or chemically equivalent to those of category (c), notably olefins, etc.; and (e) A combination of any or all of the materials in categories (a) through (d). The preferred carbon-hydrogen fragmentation compounds are methanol, dimethyl ether and $C_2$-$C_5$ olefins, with methanol and dimethyl ether being the most preferred.

Further, the FCC-CHFC process is believed to involve combination reactions which are believed to be effective, at least in part, in removing sulfur, oxygen, nitrogen and metal contaminants found in a whole crude or a heavy hydrocarbon portion thereof.

The operation of an FCC-CHFC type process is generally carried out at temperatures within the range of 400° F. up to about 1400° F. and more usually within the range of 700° F. to about 1200° F. at pressures selected from within the range of below atmospheric up to several hundred pounds per square inch gauge (psig) but normally less than 100 psig. Preferred conditions include a temperature within the range of about 800° F. to about 1150° F. and pressures within the range of atmospheric to about 200 psig and higher.

The carbon-hydrogen fragmentation compound may be provided to the process in most any way so long as it is present when contact with the catalyst material is effected, i.e., in situ generation is suitable.

In an FCC-CHFC process methanol is used in combination with a gas oil type of hydrocarbon charge stock. The weight percent of methanol in the hydrocarbon charge passed to the cracking or conversion operation will vary considerably and may be selected from within the range of between about 1% and about 25 percent by weight, it being preferred to maintain the ratio within the range between about 5% and about 20%, based on the weight of the feed. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

The FCC-CHFC process preferably employs a fluidized catalyst system at low pressures without the need for high pressure hydrogen gas. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles and act to minimize problems due to diffusion/mass transport limitations and/or heat transfer.

The FCC-CHFC process can make use of the relatively cheap carbon-hydrogen fragmentation compounds readily available in petroleum refineries, such as light gas fractions, light olefins, low boiling liquid streams, etc., and, in particular, can employ methanol, a product which is readily available in quantity, either as a transportable product from overseas natural gas conversion processes, or may be available as a product from large scale coal, shale, or tar sand gasification. It also can utilize carbon monoxide (in combination with contributors such as water or methanol), which gas is readily available from refinery regeneration flue gas (or other incomplete combustion processes), or from coal, shale, or tar sand gasification. Highly efficient recycle of carbon-hydrogen fragmentation compounds can also be effected.

The following examples were carried out to illustrate the instant invention and are not intended to be limiting thereof:

CATALYST PREPARATION

Eight catalysts were prepared for evaluation as FCC catalysts and contained the following zeolitic components:

ZEOLITE FOR CATALYST 1

Catalyst 1 is a comparative reference catalyst containing a calcined rare earth Y zeolite (CREY) and was prepared using a Y denominated zeolite "Y-52" (as described in Zeolite Catalyst Data Sheet F-3840C (7/79) by Union Carbide Corporation, Danbury, CT.) having a $SiO_2/Al_2O_3$ ratio of about 4.7.

The rare earth solution was prepared by use of a rare earth chloride solution (sold by Molycorp, Inc. as Product No. 5240) having the following chemical analysis, expressed as the oxides:

| | Weight Percent |
|---|---|
| $CeO_2$ | 10.0 |
| $La_2O_3$ | 60.0 |
| $Nd_2O_3$ | 21.5 |

-continued

| | Weight Percent |
|---|---|
| $Pr_6O_{11}$ | 7.5 |
| Other $RE_2O_3$ | 1.0 |

The product was rare earth exchanged and calcined at about 650° C. for 0.5 hour and then ammonium exchanged to give a final calcined, rare earth exchanged Y zeolite (CREY). Chemical analysis of the calcined rare earth Y zeolite gave the following:

| | Weight Percent |
|---|---|
| $SiO_2$ | 58.50 |
| $Al_2O_3$ | 20.24 |
| $(NH_4)_2O$ | 3.65 |
| $Na_2O$ | 0.79 |
| $RE_2O_3$ | 16.89 |

The rare earth exchanged zeolite Y was formed into its final form by mixing such with an inorganic oxide matrix, as hereinafter described.

ZEOLITES FOR CATALYSTS 2 TO 6

Catalysts 2 to 6 were prepared using LZ-210 zeolites prepared in accordance with the above description and the disclosure of EPC Publication No. 82,111, as above discussed.

The LZ-210 products were ammonium exchanged by the same procedure employed for Catalyst 1 (CREY).

The LZ-210 zeolites were rare earth exchanged by employing three different rare earth solutions. These rare earth solutions were prepared using a mixture of rare earth cations sold under the Product Code No. 5240 by Molycorp, Inc. Catalysts 2 and 3 were prepared using a solution containing three (3) percent by weight rare earth chlorides. Catalysts 4 and 6 were prepared using a solution containing five (5) percent by weight rare earth chlorides. Catalyst 5 was prepared using a solution containing nine (9) percent by weight rare earth chlorides. The rare earth exchange of the zeolites for Catalysts 2 to 6 were carried out similar to that employed for preparation of Catalyst 1, except that no $Na_2O$ calcination was employed in the preparation. Chemical analysis of the five LZ-210 zeolites employed in preparation of Catalysts 2 to 6 were as follows:

| | Catalyst[1] | | | | |
|---|---|---|---|---|---|
| | 2 | 3 | 4 | 5 | 6 |
| $SiO_2$ | 70.0 | 75.4 | 70.3 | 70.2 | 74.8 |
| $Al_3O_3$ | 18.6 | 13.4 | 18.1 | 18.5 | 13.4 |
| $(NH_4)_2O$ | 7.3 | 5.93 | 3.2 | 0.98 | 2.8 |
| $RE_2O_3$ | 2.91 | 2.86 | 4.98 | 8.3 | 5.1 |
| $Na_2O$ | 0.76 | 0.41 | 0.72 | 0.73 | 0.43 |

[1]Chemical analysis of the rare-earth exchanged zeolite, employed in designated catalyst, prior to formulation of the catalyst with an inorganic oxide matrix. "RE" denotes at least one rare earth cation.

FORMULATIONS OF CATALYSTS 1 TO 6

Catalysts 1 to 6 were prepared by employing the above described zeolites in the formulation of cracking catalysts containing 16 to 18 percent by weight of the selected zeolite. In addition to the above described zeolites, the following materials were employed: a stabilized silica sol containing 40 percent by weight silica in water; pseudoboehmite alumina; and a kaolin clay having the following composition:

| Component | Weight Percent |
|---|---|
| $Al_2O_3$ | 43.2 |
| $SiO_2$ | 53.1 |
| $TiO_2$ | 2.3 |
| $Fe_2O_3$ | 1.1 |
| $Na_2O$ | 0.04 |
| $K_2O$ | 0.19 |

In preparing each catalyst, the alumina was peptized by addition of an organic acid in an amount equal to 12 weight percent of the alumina. The kaolin clay was added to this slurry and blended until homogeneous mixture is observed. A slurry of the selected zeolite was added to the peptized alumina/clay slurry and the resulting mixture blended until homogeneous. The silica source was added to this mixture and blended until homogeneous. This final slurry was adjusted by addition of water to have 25 percent by weight solids. The mixture (gel) was then spray dried under conditions which result in an average particle size of about 75 microns. The catalyst was sized to exclude catalyst particles larger than 150 microns.

EXAMPLES 1 TO 6

Evaluation for Catalytic Cracking

Catalysts 1 to 6 were evaluated for catalytic cracking using a fixed-fluidized bed pilot unit in which the catalyst performed much as it would in a commercial unit. The operations make up a complete cycle of gas oil cracking, stripping, regeneration and purge. For a full catalyst evaluation at fixed process conditions 10–16 cycles are employed. The cycles are typically split and two runs carried out separately with separate distillations and product analyses.

The unit temperature, weight hourly space velocity (WHSV) and the catalyst to oil ratio (C/O) are given in Table I. The feedstock had an API gravity of 24.6°, an IBP (Initial Boiling Point) of 630° F., FBP (Final Boiling Point) of 1038° F. and UOP K Factor of 12.0. The UOP K Factor is defined as $$K = \frac{(T_B)^{\frac{1}{3}}}{d}$$

where "$T_B$" is the average boiling point in degrees Rankine and "d" is the specific gravity 60°/60° F. The Weight % Conversion is given as the (weight of the products)/(weight of the feedstock) and the Gasoline Yield is the (weight of gasoline)/(weight of feedstock).

The products from the cracking reaction are reported as the weight percent of the particular product based on the weight of the feedstock and include hydrocarbons of the types shown below:

$H_2$: Hydrogen
$C_1$: Methane
$C_2$: Ethane
$C_3$ (total): Propane and Propene
$C_3=$: Propene
$C_4$ (total): Butane, Butene and Isobutane
Gasoline: Gasoline in which the hydrocarbons have the necessary molecular weights or structures to boil between 110° F. and 430° F. (43.3° C.–221° C.).
LCO: Light Cycle Oil—Hydrocarbons which have molecular weights or structures to boil between 430° F. and 640° F. (221° C.–338° C.).
HCO: Heavy Cycle Oil—Any hydrocarbons left having boiling points greater than 640° F. (338° C.).
Coke: Hydrocarbons which may have polymerized to coke and/or heavy aromatic hydrocarbons adsorbed by the cracking catalyst and not removed during stripping.

Catalysts 1 to 6 were evaluated according to the above procedure and the results are set forth in Table I. The research octane number (RON) and the motor octane number (MON) were obtained in addition to evaluation of the catalysts for conversion and gasoline yield. The catalysts were each deactivated in 100% steam at 0 psig for 2 hours at 760° C. to simulate the deactivation of cracking catalysts in commercial operation. The rare earth content is given as $RE_2O_3$ wherein "RE" denominates any rare earth cation present as a result of the catalyst preparation.

FIG. 1 is a plot of the Research Octane Number versus the Conversion data of Table I for Comparative Catalyst 1 (CREY) and Catalysts 2, 3, 4 and 6, prepared according to this invention. The dramatic improvement in the research octane number demonstrates the synergistic nature of the $SiO_2/Al_2O_3$ ratio, low $Na_2O$ content and rare earth content of LZ-210-X.

TABLE I

| | CATALYSTS | | | | | | | | | | | | |
|---|---|---|---|---|---|---|---|---|---|---|---|---|---|
| | 1 | | 2 | | 3 | | 4 | | 5[3] | | 6 | | |
| WHSV | 40.5 | 39.7 | 40.0 | 41.8 | 39.9 | 40.0 | 40.16 | 39.50 | 40.1 | 40.0 | 39.9 | 39.7 | 40.2 |
| C/O Ratio | 2.5 | 3.0 | 3.0 | 2.4 | 2.5 | 2.5 | 2.5 | 2.5 | 2.5 | 2.5 | 2.5 | 2.5 | 2.5 |
| Cracking Temp. (°C.) | 505 | 505 | 505 | 505 | 505 | 505 | 505 | 505 | 505 | 505 | 505 | 505 | 505 |
| Wt % Conversion[4] | 69.7 | 73.33 | 73.54 | 69.98 | 68.84 | 67.67 | 69.66 | 68.16 | 69.18 | 72.29 | 72.98 | 67.9 | 70.11 |
| $H_2$ | 0.033 | 0.042 | 0.038 | 0.038 | 0.037 | 0.042 | 0.042 | 0.039 | 0.040 | 0.039 | 0.040 | 0.041 | 0.041 |
| $C_1 + C_2$ | 1.18 | 1.39 | 1.47 | 1.06 | 1.06 | 1.12 | 1.21 | 1.01 | 1.11 | 1.19 | 1.29 | 1.01 | 1.08 |
| $C_3=$ | 3.45 | 3.81 | 3.70 | 3.57 | 3.52 | 3.75 | 3.88 | 3.29 | 3.54 | 3.50 | 3.65 | 3.54 | 3.65 |
| Total $C_3$ | 4.57 | 5.06 | 5.06 | 4.50 | 4.53 | 4.53 | 4.78 | 4.08 | 4.46 | 4.56 | 4.86 | 4.32 | 4.49 |
| Total $C_4$ | 8.86 | 9.37 | 9.22 | 8.35 | 7.86 | 8.58 | 8.40 | 6.99 | 8.14 | 7.66 | 8.72 | 7.98 | 7.99 |
| Gasoline yield[4] | 51.19 | 53.04 | 52.95 | 52.92 | 52.07 | 50.52 | 52.15 | 52.88 | 52.07 | 55.00 | 53.96 | 51.62 | 53.30 |
| Octane No.[1]: | | | | | | | | | | | | | |
| RON | — | 84.8 | — | 86.9 | — | 87.2 | — | 86.0 | — | 85.7 | — | 86.7 | — |
| MON | — | 77.5 | — | 77.9 | — | 78.0 | — | 77.6 | — | 77.7 | — | 77.8 | — |
| LCO | 20.70 | 18.17 | 17.98 | 19.78 | 21.22 | 21.16 | 19.27 | 21.38 | 20.21 | 18.92 | 17.87 | 21.76 | 19.71 |
| HCO | 9.60 | 8.50 | 8.48 | 10.24 | 9.94 | 11.17 | 11.07 | 10.46 | 10.61 | 8.79 | 9.15 | 10.34 | 10.18 |
| Coke[4] | 3.87 | 4.43 | 4.80 | 3.11 | 3.28 | 2.88 | 3.08 | 3.16 | 3.36 | 3.84 | 4.11 | 2.93 | 3.21 |
| Chemical Analysis[2]: | | | | | | | | | | | | | |
| Wt % $Na_2O$ | 0.21 | 0.21 | 0.21 | 0.21 | 0.21 | 0.15 | 0.15 | 0.17 | 0.17 | 0.19 | 0.19 | 0.19 | 0.19 |
| $SiO_2$ | 46.6 | 46.6 | 46.6 | 49.6 | 49.6 | 50.7 | 50.7 | 47.7 | 47.7 | 48.7 | 48.7 | 48.6 | 48.6 |
| $Al_2O_3$ | 48.2 | 48.2 | 48.2 | 45.8 | 45.8 | 45.2 | 45.2 | 47.9 | 47.9 | 46.9 | 46.9 | 46.8 | 46.8 |

TABLE I-continued

| | CATALYSTS | | | | | | | | | | | | |
|---|---|---|---|---|---|---|---|---|---|---|---|---|
| | 1 | | | 2 | | 3 | | 4 | | 5[3] | | 6 | |
| $RE_2O_3$ | 2.38 | 2.38 | 2.38 | 0.64 | 0.64 | 0.72 | 0.72 | 0.82 | 0.82 | 1.61 | 1.61 | 0.91 | 0.91 |

[1]Average of the products of the two runs shown, except for Catalyst 1, where the two runs employed were the runs having C/O ratios of 3.0.
[2]Chemical analyses of finished catalyst for indicated components after evaluation. Catalysts 2, 3, 4, 5 and 6 were prepared without $Na_2O$ calcination during preparation, but with a final calcination before evaluation. $RE_2O_3$ is based on analysis of lanthanum, neodymium and cerium which comprised 91.5% of the rare earth cations of the starting rare earth solution. Catalysts 1, 4, 5 and 6 contained 16 wt. percent zeolite and catalysts 2 and 3 18 wt. percent zeolite.
[3]Comparative example containing greater than 5 percent by weight $RE_2O_3$, based on the zeolite.
[4]Weight % Conversion = weight of products/weight of feedstock; Gasoline Yield = (weight of gasoline)/(weight of feedstock); Coke = (weight of coke)/(weight of feedstock); Products reported as weight percent of product based on weight of feedstock.

EXAMPLE 7

The comparative catalyst of example 1 (CREY) was evaluated according to the procedure employed for examples 1 to 6 at several sets of process conditions (Runs A, B, C, and D). The results of this evaluation are set forth in Table II. A catalyst according to this invention was prepared using a LZ-210 zeolite having a $SiO_2$ to $Al_2O_3$ ratio of about 6.5 which was prepared by a procedure similar to that employed for the catalyst of example 2. The rare earth exchanged LZ-210 zeolite was formed into a catalyst in a manner similar to that described for the preparation of catalysts 2 to 6. Chemical analysis of the sprayed dried finished catalyst gave the following:

| | Weight Percent |
|---|---|
| $SiO_2$ | 48.24 |
| $Al_2O_3$ | 47.70 |
| $Na_2O$ | 0.31 |
| $RE_2O_3$ | 0.45 |

Figure 2:
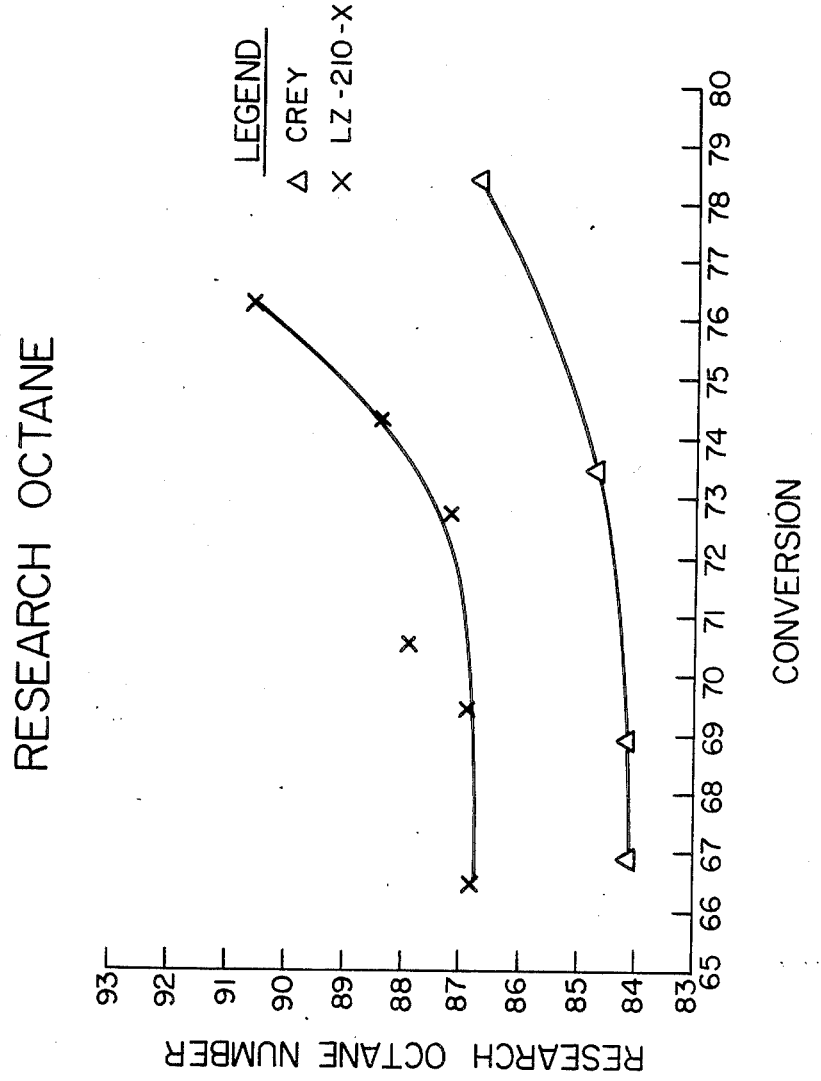
FIG. 2 is a plot of Research Octane Number vs. Conversion for a CREY catalyst and for a catalyst according to this invention (LZ-210-X).
Figure 3:
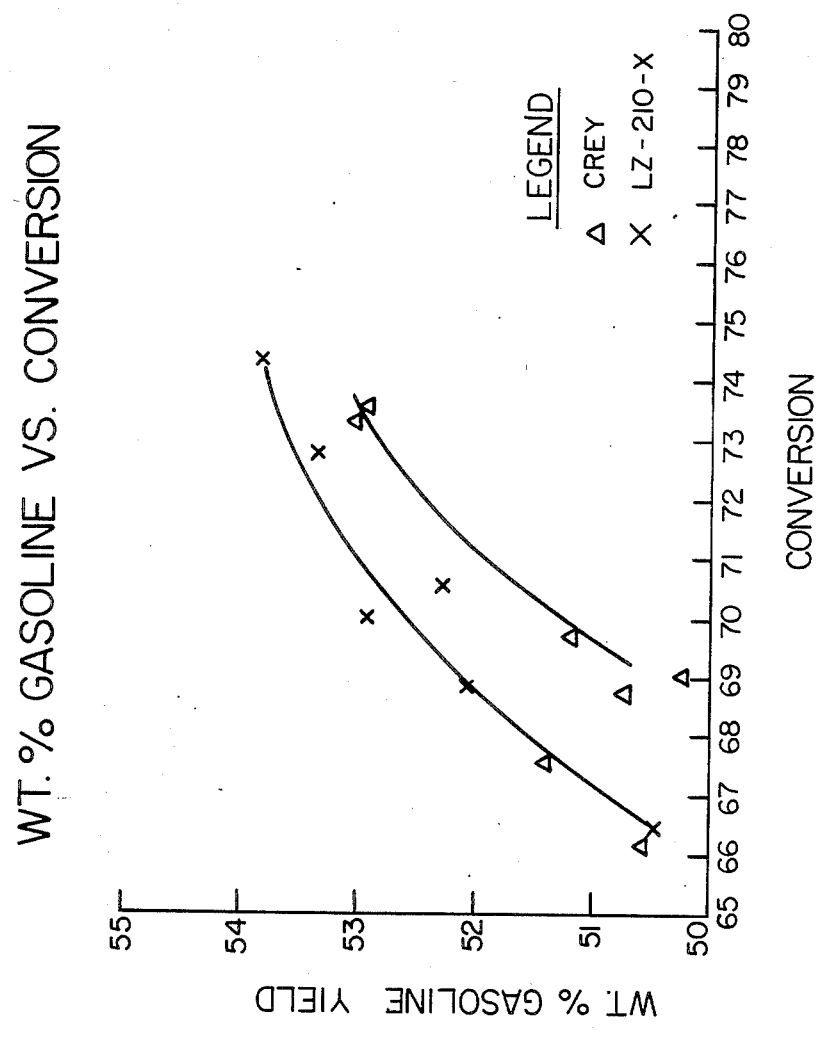
FIG. 3 is a plot of Weight Percent Gasoline vs. Conversion for a CREY catalyst and for a catalyst according to this invention (LZ-210-X).
Figure 4:
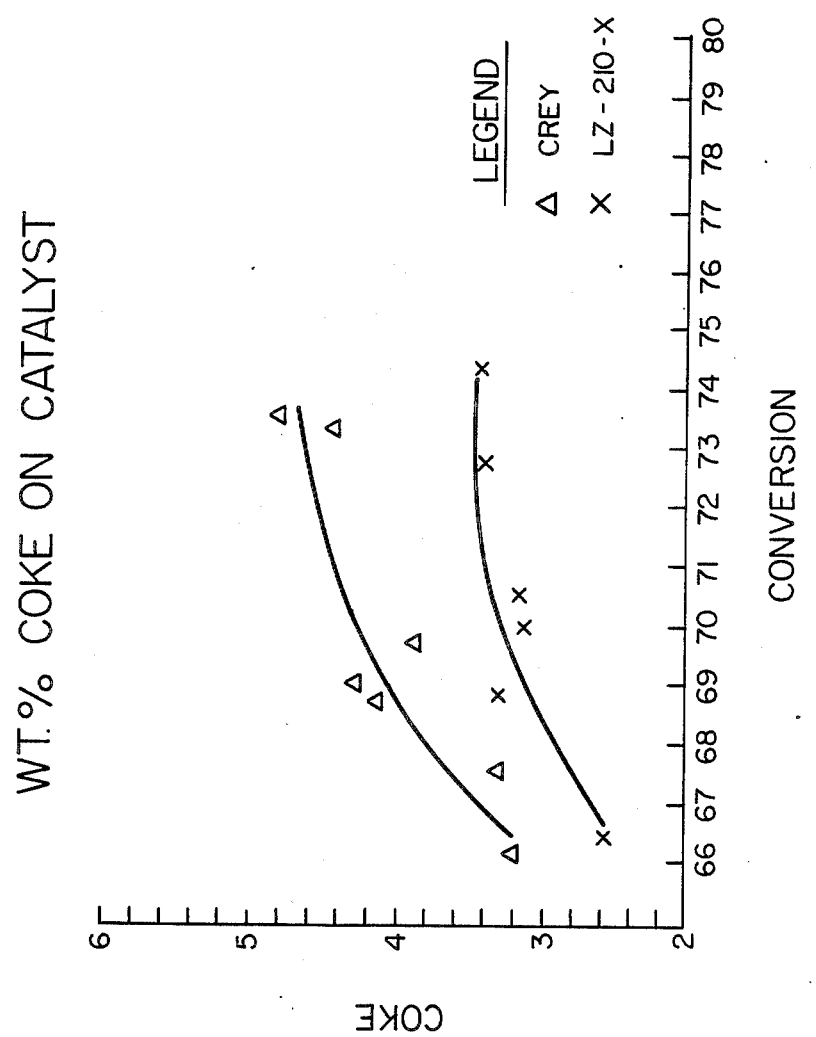
FIG. 4 is a plot of Weight Percent Coke vs. Conversion for a CREY catalyst and for a catalyst according to this invention (LZ-210-X).

The above catalyst of this invention was then evaluated according to the procedure employed for examples 2 to 6 at several sets of process conditions (Runs A, B, C, D and E). The results are set forth in Table II and are graphically depicted in FIGS. 2 and 4 wherein the improvement in octane number of the products, gasoline selectivity and coke selectivity are shown as compared with the CREY catalyst evaluated in this example and reported in Table II. This improvement in octane number with improvement in gasoline selectivity and coke selectivity is not observed for high rare earth CREY catalysts. FIGS. 2, 3 and 4 show that catalysts according to this invention gave products having improved octane number, improved gasoline yield and improved coke (lower weight percent coke formed).

EXAMPLE 8

Two catalysts were prepared for evaluation. The first catalyst contained 16 percent by weight of a calcined rare earth exchanged Y zeolite (CREY) and was prepared similar to the procedure used to prepare Catalyst 1 of Example 1. The finished catalyst was steam deactivated at 843° C. in 100% steam for 2 hours. Chemical analysis of the CREY catalyst gave the following (calcined rare earth zeolite Y and matrix):

| | Weight Percent |
|---|---|
| $SiO_2$ | 47.65 |
| $Al_2O_3$ | 48.31 |
| $Na_2O$ | 0.17 |
| $RE_2O_3$ | 1.52 |

The second catalyst (a LZ-210-X) was prepared according to this invention and contained 18 percent by weight of an ammonium and rare earth exchanged form of zeolite LZ-210 having a $SiO_2$ to $Al_2O_3$ ratio of 9.0. The catalyst was prepared similar to the procedure employed for Catalysts 2 to 6, infra. Chemical analysis of the catalyst (zeolite and matrix) gave the following:

| | Weight Percent |
|---|---|
| $SiO_2$ | 52.62 |
| $Al_2O_3$ | 46.63 |
| $Na_2O$ | 0.12 |
| $RE_2O_3$ | 0.41 |

The CREY catalyst and the LZ-210-X catalyst were evaluated by a procedure similar to that employed for Catalysts 1 to 6, infra, except that a circulating fluid bed catalytic cracking pilot unit was employed and the LCO and HCO fraction were measured as from 430° F.

TABLE II

| | CREY CATALYSTS | | | | | | | | LZ-210-X CATALYSTS | | | | |
|---|---|---|---|---|---|---|---|---|---|---|---|---|---|
| | A | | B | | C | | D | | A | B | C | D | E |
| WHSV | 40.0 | 40.3 | 39.7 | 40.0 | 59.3 | 59.7 | 59.5 | 59.4 | 10.0 | 19.9 | 39.5 | 39.7 | 40.2 |
| C/O Ratio | 5.0 | 5.0 | 3.0 | 3.0 | 2.5 | 2.5 | 2.0 | 2.0 | 4.0 | 4.0 | 4.0 | 3.5 | 3.0 |
| Cracking Temp. (°C.) | 505 | 505 | 505 | 505 | 505 | 505 | 505 | 505 | 505 | 505 | 505 | 505 | 505 |
| Wt % Conversion[1] | 78.6 | 78.1 | 73.3 | 73.5 | 68.7 | 69.0 | 66.2 | 67.6 | 76.3 | 74.3 | 72.7 | 70.5 | 66.5 |
| $H_2$ | 0.046 | 0.044 | 0.042 | 0.038 | 0.032 | 0.034 | 0.030 | 0.029 | 0.047 | 0.038 | 0.085 | 0.087 | 0.033 |
| $C_1 + C_2$ | 1.9 | 1.9 | 1.4 | 1.5 | 1.3 | 1.3 | 1.0 | 1.0 | 1.61 | 1.28 | 1.15 | 1.17 | 0.93 |
| $C_3=$ | 4.27 | 4.23 | 3.8 | 3.7 | 3.4 | 3.5 | 3.0 | 3.1 | 4.96 | 4.33 | 4.08 | 3.86 | 3.41 |
| Total $C_3$ | 6.1 | 6.1 | 5.1 | 5.1 | 4.5 | 4.7 | 3.9 | 4.0 | 6.01 | 5.18 | 4.82 | 4.58 | 4.01 |
| Total $C_4$ | 11.0 | 10.9 | 9.4 | 9.2 | 8.1 | 8.5 | 7.5 | 7.8 | 11.53 | 10.57 | 10.01 | 9.31 | 8.45 |
| Gasoline yield[1] | 52.8 | 52.3 | 53.0 | 53.0 | 50.8 | 50.3 | 50.6 | 51.4 | 53.0 | 53.8 | 53.3 | 52.3 | 50.5 |
| Octane No.[2]: RON | 86.8 | — | 84.8 | — | 84.2 | — | 84.2 | — | 90.6 | 88.4 | 87.2 | 87.9 | 86.8 |
| LCO | 14.3 | 15.0 | 18.2 | 18.0 | 20.5 | 20.3 | 20.9 | 20.8 | 15.7 | 16.6 | 17.4 | 18.8 | 21.9 |
| HCO | 7.1 | 6.9 | 8.5 | 8.5 | 10.7 | 10.7 | 12.9 | 11.6 | 8.1 | 9.1 | 9.8 | 10.6 | 11.6 |
| Coke[1] | 6.8 | 6.9 | 4.4 | 4.8 | 4.13 | 4.3 | 3.2 | 3.3 | 4.09 | 3.42 | 3.38 | 3.15 | 2.57 |

Figure 5:
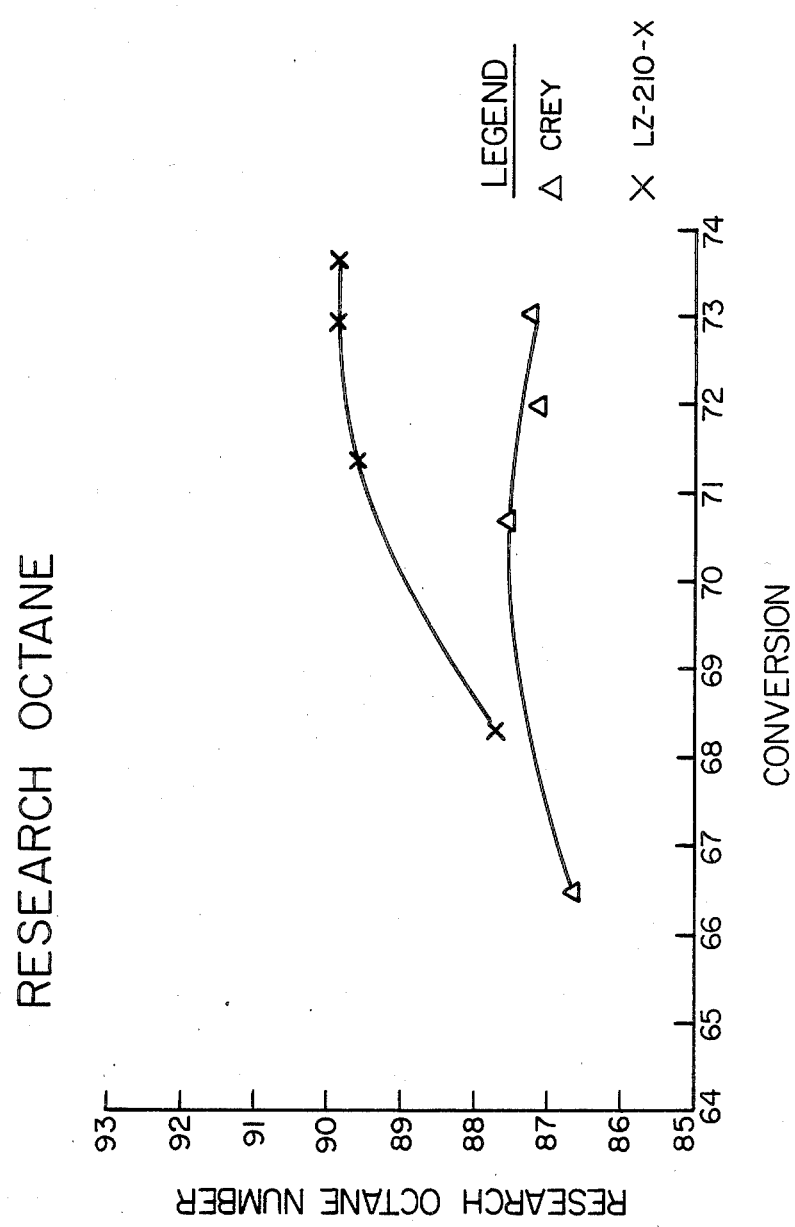
FIG. 5 is a plot of Research Octane Number vs. Conversion for a CREY catalyst and for a catalyst according to this invention (LZ-210-X).
Figure 6:
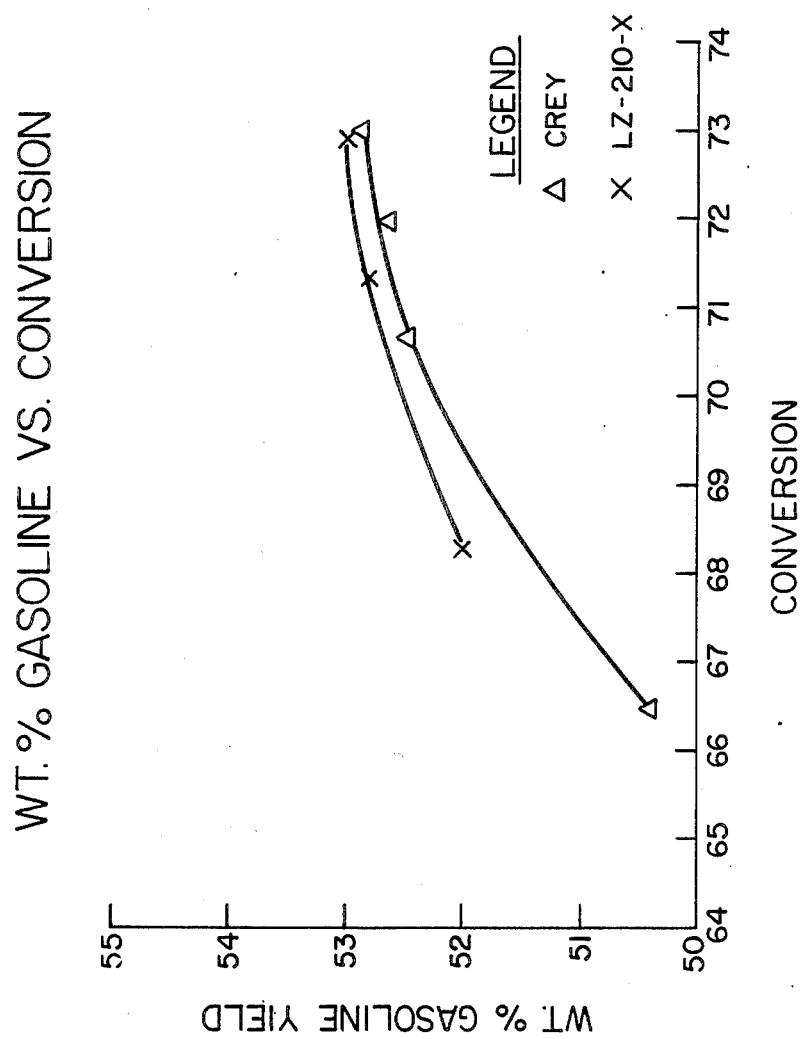
FIG. 6 is a plot of Weight Percent Gasoline Vs. Conversion for a CREY catalyst and for a catalyst according to this invention (LZ-210-X).
Figure 7:
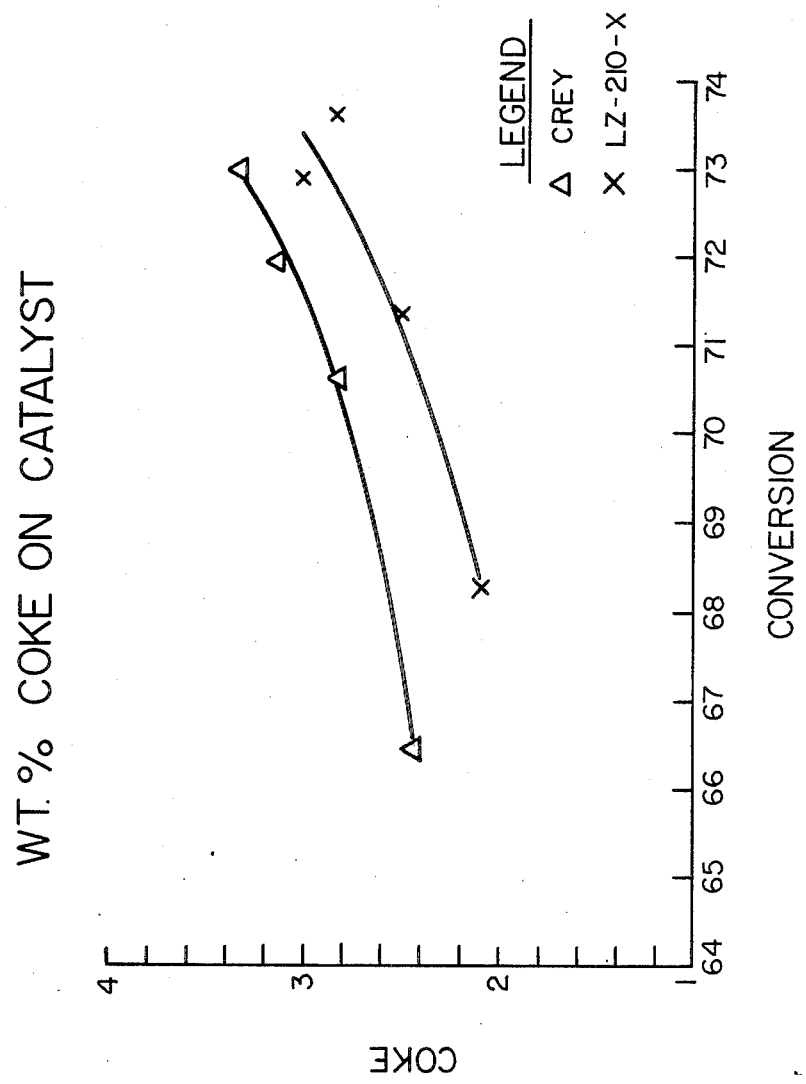
FIG. 7 is a plot of Weight Percent Coke vs. Conversion for a CREY catalyst and for a catalyst according to this invention (LZ-210-X).

[1]All values are as defined for Table 1.
[2]Average of the products of the two duplicate runs shown for each CREY catalyst evaluated at each set of process conditions.

to 650° F. and greater than 650° F., respectively. Further, the feedstock had an API gravity of 26.6°, an IBP of 524° F., a FBP of 993° F. and UOP K Factor of 12.0. The evaluations of the CREY catalyst and the LZ-210-X catalyst are set forth in Table III. FIGS. 5, 6 and 7 graphically depict the relationship of Research Octane Number, Weight Percent Gasoline and Weight Percent Coke vs. Conversion for each catalyst. In each instance the catalyst according to this invention gave products having a higher Research Octane Number, Weight Percent Gasoline and a lower Weight Percent Coke.

processes. The % Conversion, % Gasoline Selectivity, and % Coke are set forth in Table IV.

TABLE IV

| Example | Wt % Conversion[1] | Wt % Gasoline Selectivity[2] | Wt % Coke[3] | Deactivation Temp. (°C.) |
|---|---|---|---|---|
| 9 | 75.4 | 65.1 | 1.90 | 760 |
| 10 | 66.9 | 71.6 | 1.45 | 800 |
| 11 | 63.1 | 82.3 | 1.09 | 843 |

[1]As defined in ASTM test method D-3907
[2]% Gasoline Selectivity = (Gasoline Yield)/(Wt. % Conversion)

TABLE III[1]

| | CREY CATALYST | | | | LZ-210-X CATALYST | | | |
|---|---|---|---|---|---|---|---|---|
| | A | B | C | D | A | B | C | D |
| WHSV | 15.4 | 15.1 | 15.2 | 14.8 | 15.7 | 14.6 | 14.6 | 15.4 |
| C/O Ratio | 3.1 | 4.1 | 5.1 | 6.0 | 3.3 | 4.3 | 5.5 | 6.2 |
| Cracking Temp. (°F.) | 900 | 900 | 900 | 900 | 900 | 900 | 900 | 900 |
| Wt % Conversion | 66.5 | 70.7 | 72.0 | 73.0 | 68.3 | 71.3 | 73.6 | 72.9 |
| $H_2$ | 0.06 | 0.08 | 0.07 | 0.08 | 0.07 | 0.07 | 0.08 | 0.08 |
| $C_1 + C_2$ | 1.7 | 1.4 | 1.5 | 1.5 | 1.2 | 1.4 | 1.5 | 1.1 |
| $C_3=$ | 3.7 | 4.3 | 4.4 | 4.6 | 4.0 | 4.5 | 5.1 | 4.5 |
| Total $C_3$ | 4.3 | 5.0 | 5.1 | 5.3 | 4.4 | 5.0 | 5.7 | 5.3 |
| Total $C_4$ | 7.5 | 8.6 | 8.2 | 9.0 | 7.7 | 9.2 | 10.5 | 10.1 |
| Gasoline yield | 50.4 | 52.5 | 52.7 | 52.9 | 52.0 | 52.8 | 52.0 | 53.0 |
| Octane No.: | | | | | | | | |
| RON | 86.7 | 87.6 | 87.2 | 87.3 | 87.7 | 89.6 | 89.9 | 89.9 |
| MON | 76.0 | 75.9 | 76.0 | 76.6 | 79.6 | 76.2 | 76.6 | 79.7 |
| LCO | 21.5 | 18.2 | 19.0 | 17.0 | 21.5 | 19.1 | 18.7 | 17.9 |
| HCO | 12.1 | 11.2 | 9.0 | 10.0 | 10.2 | 9.5 | 7.7 | 9.2 |
| Coke | 2.5 | 2.8 | 3.2 | 3.4 | 2.1 | 2.5 | 2.8 | 3.0 |

[1]Values for wt % conversion, % Gasoline Yield and % Coke are as defined for Table 1.

EXAMPLES 9 TO 11

Catalysts 9 to 11 were prepared to demonstrate the use of catalysts containing rare earth forms of Y zeolites and rare earth forms of LZ-210 according to this invention. Examples 9 to 11 were prepared using 10 percent by weight of the CREY, based on the total catalyst weight, employed in preparng Catalyst 1 and 10 percent by weight, based on the total catalyst weight of LZ-210 zeolites having $SiO_2/Al_2O_3$ mole ratios of 9.0 and rare earth contents (weight percent based on total weight of rare earth exchanged LZ-210 zeolite) of 4.5.

Catalysts 9 to 11 were prepared by forming an aqueous mixture containing 25 weight percent solids, as described for Catalysts 1 to 6, to give an aqueous mixture of CREY, a pseudoboehmite alumina, a silica sol and a kaolin clay, containing:

| | Weight Percent[1] |
|---|---|
| CREY | 10.00 |
| LZ-210 | 10.00 |
| Alumina | 5.00 |
| Silica | 55.00 |
| Kaolin Clay | 20.00 |

[1]Weight percent based on total weight of solids

Catalysts 9 to 11 were prepared according to the procedures employed for Catalysts 1 to 6. Catalysts 9 to 11 were analyzed for their $Na_2O$ and $RE_2O_3$ contents and gave 0.22 wt. percent $Na_2O$ and 1.49 wt. percent $RE_2O_3$ where "RE" denotes at least one rare earth cation.

Catalysts 9 to 11 were evaluated for catalytic cracking according to ASTM test method D-3907. The catalysts were treated at various temperatures, as shown in Table IV, in 100% steam for 2 hours, to simulate deactivation similar to that found in commercial cracking

[3]Wt. % Coke = (Weight of Coke)/(Weight of Feedstock)

What is claimed is:

1. A cracking catalyst comprising a zeolitic aluminosilicate having a mole ratio of oxides in the dehydrated state of $$(0.85-1.1)\ M_{2/n}O:Al_2O_3:xSiO_2$$

wherein "M" is a cation having a valence of "n"; "x" has a value greater than 6.0 to about 7.0; has an x-ray powder diffraction pattern having at least the d-spacings of Table A; has extraneous silicon atoms in the crystal lattice in the form of framework $SiO_4$ tetrahedra; an inorganic oxide matrix; has an effective amount between greater than zero to less than 5 weight percent, based on the weight of the aluminosilicate employed in the catalyst, expressed as the oxide, of at least one rare earth cation selected from the group consisting of cerium, lanthanum, praseodymium, neodymium, promethium, samarium, europium, gadolinium, terbium, dysprosium, holmium, erbium, thulium, ytterbium and lutetium; and less than 1.2 weight percent $Na_2O$ based on the wright of the aluminosilicate employed in the catalyst.

2. The cracking catalyst of claim 1 wherein the weight percent $Na_2O$ is less than 1.0 weight percent.

3. The cracking catalyst of claim 2 wherein the weight percent $Na_2O$ is less than 0.9 weight percent.

4. The cracking catalyst of claim 1 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein $$\frac{b + (N - \Delta z)}{a - N}$$

has a value greater than 6.0 and less than 9.0; the change in defect structure factor $\Delta z$ is less than 0.08; an increased silicon content in the framework, corresponding to a value for $(N-\Delta z)/N$ of at least 0.5; $a+b+z=1$; $(a-N)+[b+(N-\Delta z]+z=1$; and a cation equivalent expressed as a monovalent cation species, $M^+/Al$, from 0.85 to 1.1, and the characteristic crystal structure of zeolite Y as indicated by an X-ray powder diffraction pattern having at least the d-spacings set forth broadly in Table A.

5. The cracking catalyst of claim 4 wherein the change in defect structure $\Delta z$ is less than 0.05.

6. The catalyst of claim 1 wherein the rare earth cation is present in amount between 0.5 to about 4 percent by weight based on the weight of the aluminosilicate.

7. The catalyst of claim 6 wherein the rare earth oxide content is between about 2.0 and about 3.0 percent by weight based on the weight of the aluminiosilicate.

* * * * *